United States Patent [19]

Loiseau et al.

[11] Patent Number: 4,815,692

[45] Date of Patent: Mar. 28, 1989

[54] TAP FOR A CYLINDER OF GAS UNDER PRESSURE

[76] Inventors: Gérard Loiseau, 4, rue Robespierre, 78390 Bois d'Darcy; Maurice Molozay, 1, allée des Charpentiers, 78302 Le Mesnil Saint Denis, both of France

[21] Appl. No.: 168,684

[22] Filed: Mar. 16, 1988

[30] Foreign Application Priority Data

Mar. 17, 1987 [FR] France ............... 87 03641

[51] Int. Cl.⁴ ........................... F16K 31/143
[52] U.S. Cl. .................... 251/14; 251/63.5; 251/335.3
[58] Field of Search ............ 251/61.4, 61.5, 63.5, 251/63.6, 14, 82, 335.3

[56] References Cited

U.S. PATENT DOCUMENTS

| | | | |
|---|---|---|---|
| 1,888,392 | 11/1932 | Penick et al. | 251/86 |
| 2,431,283 | 11/1947 | Spence | 251/14 |
| 2,890,014 | 6/1959 | Luoma et al. | 251/14 |
| 3,026,081 | 3/1962 | Rossi | 251/14 |
| 3,378,224 | 4/1968 | Boyle | 251/14 |
| 3,587,634 | 6/1971 | Krause | 137/522 |
| 3,765,642 | 10/1973 | Nelson | 251/14 |
| 3,904,167 | 9/1975 | Touch et al. | 251/14 |
| 4,316,482 | 2/1982 | Pearce et al. | 251/14 |

FOREIGN PATENT DOCUMENTS 858537 7/1949 Fed. Rep. of Germany .
861665 2/1961 United Kingdom .

Primary Examiner—George L. Walton

[57] ABSTRACT

The tap for a cylinder of gas under pressure is of the type comprising a body adapted to be fixed on a cylinder head (9) with a gas flow passage (10-13) provided with a valve (12) having a rod (14) slidable through a sealing bellows (17) and connected to a rod (21) of a pneumatic control piston (24) with provision of an opposing spring (28) for biasing the piston to a position for closing the valve (12). Manual means (31-32-33) are provided for axially shifting the piston (24) with an abutment in a position for closing the valve (12). The tap is particularly adapted to the transfer of gases having degrees of toxicity.

2 Claims, 1 Drawing Sheet

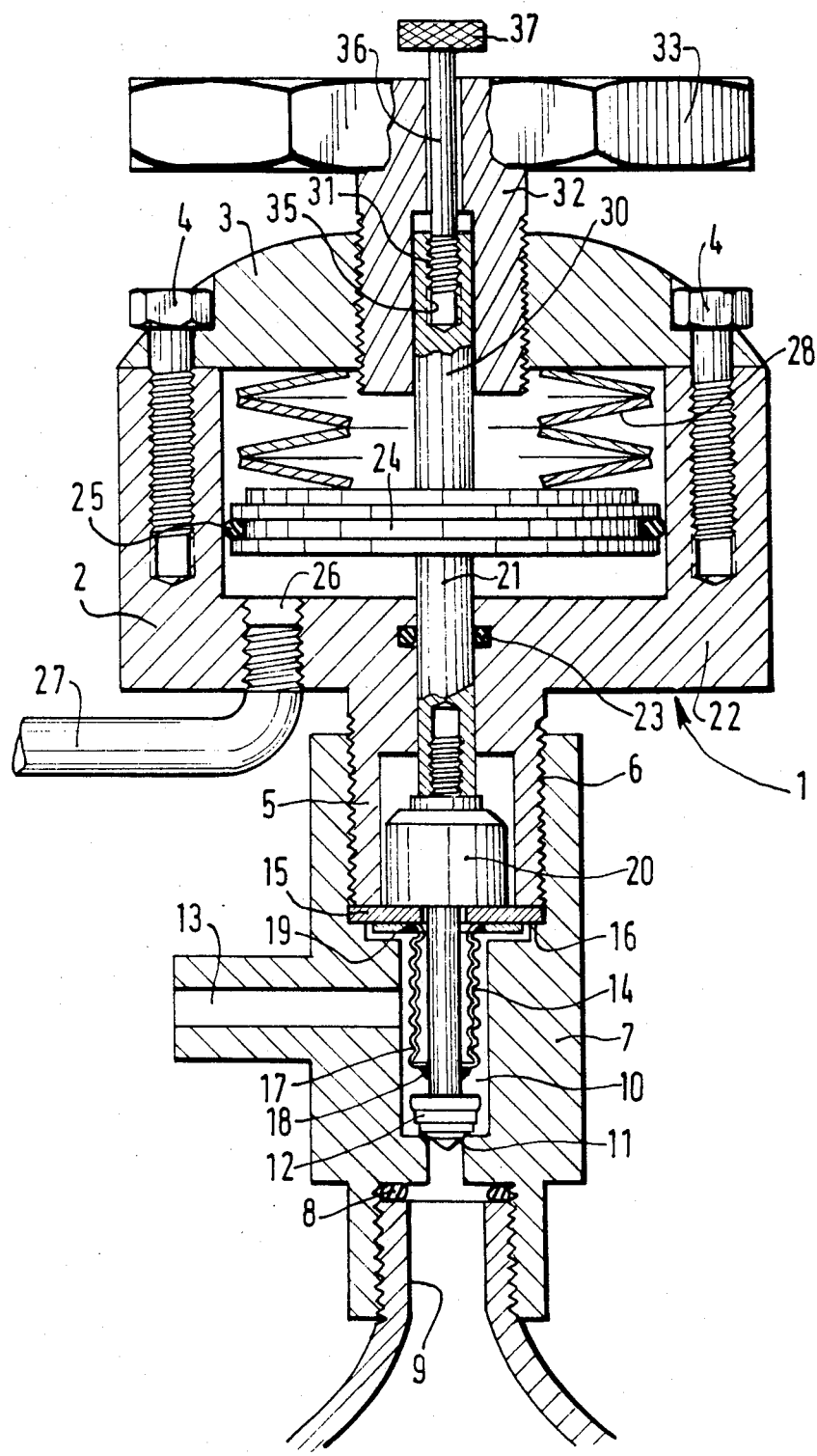

TAP FOR A CYLINDER OF GAS UNDER PRESSURE

The present invention relates to a tap for a cylinder of gas under pressure, of the type comprising a body for fixing on a cylinder head with a gas flow passage provided with a valve having a valve rod which is movable through a sealing bellows and is connected to a rod of a pneumatic control piston provided with a spring exerting an opposing action for returning the valve to the closing position and manual means for axially shifting the piston with an abutment in the valve closing position.

An object of the invention is to provide additional operational conditions independent of the pneumatic control.

In the tap according to the invention, the manual means for maintaining the piston in the valve closing position comprise an axial extension of the piston rod, adjustable abutment means comprising a member including a hand wheel adapted to be screwed in the body of the tap to a position of abutment against said axial extension in the valve closing position of the piston. Preferably, the hand wheel member is a cylindrical member having an axial cylindrical recess freely slidably engaged around the extension of the piston rod, screwed by the hand wheel inwardly of the body of the tap and having an inner end which forms an abutment for said extension of the piston rod. Furthermore, the piston rod extension has an additional axial extension through the hand wheel member with a rear abutment against said member at a distance which is normally greater than the travel of the piston.

The features and advantages of the invention will be apparent from the following description which is given by way of example with reference to the accompanying drawing which is a sectional view of a tap according to the invention.

The tap comprises a control body 1 in the form of a base 2 surmounted by a cover 3 closed by screws 4. The base 2 includes a screw-threaded spigot 5 screw-threadedly engaged in a cavity 6 of a tap body 7 which is screw-threadedly engaged on the cylinder head 9, with interposition of a sealing element 8.

The tap body 7 defines an axial passage 10 which is narrowed to define a seat 11 for a valve 12 communicating with a transverse gas drawing off passage 13.

The valve 12 is connected to a valve rod 14 freely extending through a closing plate 15 which is clamped in a sealed manner against a shoulder 16 of the tap body 7 by the end of the spigot 5. A sealing bellows 17 is soldered at 18 to the valve rod 14 and at 19 to the sealing plate 15.

The rod 14 carries an abutment 20 for bearing against the plate 15 in the closing position of the valve 12 and is extended at 21 through the end wall 22 of the base 2 with provision of a sealing element 23. The extension 21 carries a piston body 24 which is slidably mounted, with provision of a sealing element 25, in a cylindrical chamber defined by the base 2 and the cover 3. The piston 24 is shifted to the valve opening position by a compressed gas, supplied through an orifice 26 in the end wall 22 of the base and conducted through a pipe 27, against the opposing action of a compression spring 28.

The piston rod 14 has an extension 30 which is freely slidable in an axial cylindrical cavity 31 of a screw-threaded member 32 which has an actuating hand wheel 33 and is screw-threadedly engaged in the cover 3.

The rod extension 30 defines a tapped cavity 35 in which is screw-threadedly engaged a rod 36 having an abutment-knob 37 which projects outwardly through a bore 38 in the wheel 33. Generally, the abutment member 37 is not mounted on the tap. It is carefully kept to hand and is only used occasionally in the event of difficulty.

In normal operation, the wheel 33 is screwed in such manner as to produce, between the rod end 30 and the inner end of the cavity 31, a clearance slightly larger than the travel for opening the valve 12 when the pressure is allowed to enter at 26-27.

The safety closing position is obtained manually by screwing the wheel 33 until the inner end of the cavity 31 abuts against the free end of the rod extension 30, while the piston 25 and the valve member 12 are in the valve closing position. In this position, the application of the pressure through the conduit 27 is inoperative for shifting the piston 25 and consequently the valve 12 to open the valve.

In case of need created by an operational difficulty, the valve 12 can be shifted away from its seat 11 and thus allow the passage of the gas, even without application of compressed gas in the conduit 27, by unscrewing the wheel 33 until it comes to abut against the knob 37, and by pursuing the unscrewing movement, which has for effect to shift the assembly comprising the rod 36, the rod 30, and the piston 24 in opposition to the action of the spring 28 and thereby shift the valve 12 away from its seat 11.

The described tap is particularly adapted for the transfer of gases having degrees of toxicity.

We claim:

1. A tap for a cylinder of gas under pressure, said tap comprising a control body for fixing on a cylinder head and defining a chamber, means defining a gas flow passage for connection to the cylinder head, a valve for opening and closing said passage and provided with a valve rod, a sealing bellow, said valve rod being movable through said bellows, a pneumatic control piston slidable in said chamber and having piston rod connected to said valve rod, a return spring associated with the piston for biasing the piston to a given position for closing said valve, manual means combined with the piston for axially shifting the piston, said manual means comprising an axial extension of the piston rod, said axial extension having an end portion and adjustable abutment means comprising a hand wheel member, wherein said hand wheel member includes a cylindrical member having a cylindrical cavity and an inner end, said end portion of said axial extension being spaced from said inner end of said cylindrical cavity to define a gap therebetween, the hand wheel member being freely slidably engaged around said extension of the piston rod and having an inner end wall providing an abutment for said extension of the piston rod as said piston is axially shifted, said hand wheel member being screw-threadedly engaged in said control body for variably changing said gap while defining different abutment positions between said end portion of said axial extension and said inner end of said cylindrical cavity for varying the degree of opening of said valve.

2. A tap according to claim 1, comprising an additional extension which is detachably engaged in the extension of the piston rod and extends outwardly through the hand wheel member with provision of a rear abutment which is cooperative with said hand wheel member upon travel of the additional extension relative to the hand wheel member which exceeds the travel of the piston.

* * * * *